US009163764B2

(12) United States Patent
Zund et al.

(10) Patent No.: US 9,163,764 B2
(45) Date of Patent: Oct. 20, 2015

(54) VALVE FOR LIQUID VESSELS

(75) Inventors: Marco Zund, Balgach (CH); Felix Scheiwiller, Diepoldsau (CH); Markus Erb, Ebikon (CH)

(73) Assignee: CWS-boco Supply AG, Baar (CH)

( * ) Notice: Subject to any disclaimer, the term of this patent is extended or adjusted under 35 U.S.C. 154(b) by 197 days.

(21) Appl. No.: 13/985,538

(22) PCT Filed: Feb. 15, 2011

(86) PCT No.: PCT/CH2011/000029
§ 371 (c)(1),
(2), (4) Date: Sep. 16, 2013

(87) PCT Pub. No.: WO2012/109763
PCT Pub. Date: Aug. 23, 2012

(65) Prior Publication Data
US 2014/0023297 A1 Jan. 23, 2014

(51) Int. Cl.
*F16L 37/05* (2006.01)
*B65D 47/24* (2006.01)
(Continued)

(52) U.S. Cl.
CPC .............. *F16L 37/05* (2013.01); *B65D 33/16* (2013.01); *B65D 47/248* (2013.01); *F16L 37/38* (2013.01)

(58) Field of Classification Search
CPC ......... F16L 55/115; F16L 37/05; F16L 37/38; B65D 47/248; B65D 33/16; B65D 51/1644; B65D 51/1633; B65D 51/16; B65D 45/02; A61M 39/26; A61M 2039/263; A61M 2039/266; A61M 2039/267; A61M 37/045
USPC .......... 383/43, 44, 48, 53, 100, 103; 251/149.6, 149.7, 333; 222/522, 544, 222/563, 566, 107, 495, 496, 509; 220/203.23, 203.24, 203.27, 203.01; 215/315, 311, 317
See application file for complete search history.

(56) References Cited

U.S. PATENT DOCUMENTS 2,391,022 A * 12/1945 Main .......................... 251/149.4
2,503,495 A * 4/1950 Koester ...................... 251/149.6
2,551,315 A * 5/1951 Christopher et al. ......... 604/403
(Continued)

FOREIGN PATENT DOCUMENTS

EP        0998644 A1    2/1999

OTHER PUBLICATIONS

English translation of the International Preliminary Report on Patentability dated Aug. 29, 2013 in corresponding International Patent Application No. PCT/CH2011/000029, filed Feb. 15, 2011.

*Primary Examiner* — Jes F Pascua
*Assistant Examiner* — Peter Helvey
(74) *Attorney, Agent, or Firm* — Rankin, Hill & Clark LLP

(57) ABSTRACT

A valve for opening and closing a liquid vessel or pouch, which includes a valve body having a central axis, top and bottom sides arranged transversely with respect to the central axis, and a passage opening that extends through the valve body coaxially from the top side to the bottom side. A closure element can be pressed into the passage opening by a spring element coaxially with respect to the central axis from the underside such that the passage opening can be closed in a liquid-tight manner. The closure element includes a first sealing lip which can be pressed into the passage opening with an interference fit P1 and, axially behind said first sealing lip, a second sealing lip, which can be pressed into the passage opening with an interference fit P2, wherein P2 is a stronger interference fit than P1.

17 Claims, 6 Drawing Sheets

(51) Int. Cl.
*B65D 33/16* (2006.01)
*F16L 37/38* (2006.01)

(56) References Cited

U.S. PATENT DOCUMENTS

| | | | | |
|---|---|---|---|---|
| 3,199,831 | A * | 8/1965 | Sully | 251/149.6 |
| 3,806,086 | A | 4/1974 | Cloyd | |
| 4,709,725 | A * | 12/1987 | Morrison | 137/614.04 |
| 4,932,431 | A * | 6/1990 | Silagy | 137/174 |
| 5,095,962 | A * | 3/1992 | Lloyd-Davies et al. | 141/346 |
| 5,353,837 | A * | 10/1994 | Faust | 137/614.18 |
| 5,509,433 | A * | 4/1996 | Paradis | 137/1 |
| 5,671,890 | A * | 9/1997 | Cooper et al. | 239/533.7 |
| 5,782,816 | A * | 7/1998 | Werschmidt et al. | 604/256 |
| 5,788,215 | A * | 8/1998 | Ryan | 251/149.6 |
| 5,950,986 | A * | 9/1999 | Daugherty et al. | 251/149.6 |
| 6,089,541 | A * | 7/2000 | Weinheimer et al. | 251/149.6 |
| 6,113,068 | A * | 9/2000 | Ryan | 251/149.4 |
| 6,543,745 | B1 * | 4/2003 | Enerson | 251/149.7 |
| 6,557,904 | B2 * | 5/2003 | Naito | 285/316 |
| 6,871,838 | B2 * | 3/2005 | Raines et al. | 251/149.4 |
| 6,886,803 | B2 * | 5/2005 | Mikiya et al. | 251/149.1 |
| 6,886,804 | B2 * | 5/2005 | Doi et al. | 251/149.6 |
| 6,997,352 | B2 * | 2/2006 | Sallows et al. | 222/105 |
| 7,014,169 | B2 * | 3/2006 | Newton et al. | 251/149.6 |
| 7,077,176 | B2 * | 7/2006 | Py | 141/301 |
| 7,396,348 | B2 * | 7/2008 | Newton et al. | 604/256 |
| 7,559,530 | B2 * | 7/2009 | Korogi et al. | 251/149.6 |
| 7,758,566 | B2 * | 7/2010 | Simpson et al. | 604/537 |
| 7,789,864 | B2 * | 9/2010 | Cote et al. | 604/256 |
| 7,793,914 | B2 * | 9/2010 | Danielson | 251/149.9 |
| 7,803,139 | B2 * | 9/2010 | Fangrow, Jr. | 604/256 |
| 7,824,393 | B2 * | 11/2010 | Fangrow | 604/533 |
| 7,837,658 | B2 * | 11/2010 | Cote et al. | 604/236 |
| 7,841,580 | B2 * | 11/2010 | Konishi et al. | 251/149.6 |
| 7,857,285 | B2 * | 12/2010 | Lee et al. | 251/149.6 |
| 7,887,519 | B2 * | 2/2011 | Cote et al. | 604/247 |
| 7,981,090 | B2 * | 7/2011 | Plishka et al. | 604/249 |
| 7,993,328 | B2 * | 8/2011 | Whitley | 604/537 |
| 8,048,038 | B2 * | 11/2011 | Guala | 604/246 |
| 8,500,088 | B2 * | 8/2013 | Freed | 251/149.7 |
| 8,512,562 | B2 * | 8/2013 | Ogawa et al. | 210/248 |
| 8,568,371 | B2 * | 10/2013 | Siopes et al. | 604/256 |
| 8,628,516 | B2 * | 1/2014 | Naftalovitz et al. | 604/537 |
| 8,647,310 | B2 * | 2/2014 | Fangrow et al. | 604/236 |
| 8,758,306 | B2 * | 6/2014 | Lopez et al. | 604/247 |
| 2002/0179875 | A1 * | 12/2002 | Davis et al. | 251/149.6 |
| 2003/0015679 | A1 * | 1/2003 | Haunhorst et al. | 251/149.6 |
| 2003/0066978 | A1 | 4/2003 | Enerson | |
| 2005/0127114 | A1 | 6/2005 | Parrish | |
| 2006/0163515 | A1 * | 7/2006 | Ruschke | 251/149.7 |
| 2007/0251591 | A1 * | 11/2007 | Kiehne | 137/844 |
| 2008/0092977 | A1 * | 4/2008 | Zeyfang | 138/96 R |
| 2009/0205726 | A1 * | 8/2009 | Kouda | 137/614.03 |
| 2012/0241023 | A1 * | 9/2012 | Ikeda et al. | 137/487 |
| 2013/0119084 | A1 * | 5/2013 | Morayko | 222/83 |
| 2013/0292592 | A1 * | 11/2013 | Py | 251/149.6 |
| 2015/0101941 | A1 * | 4/2015 | Nakatani | 206/216 |

* cited by examiner

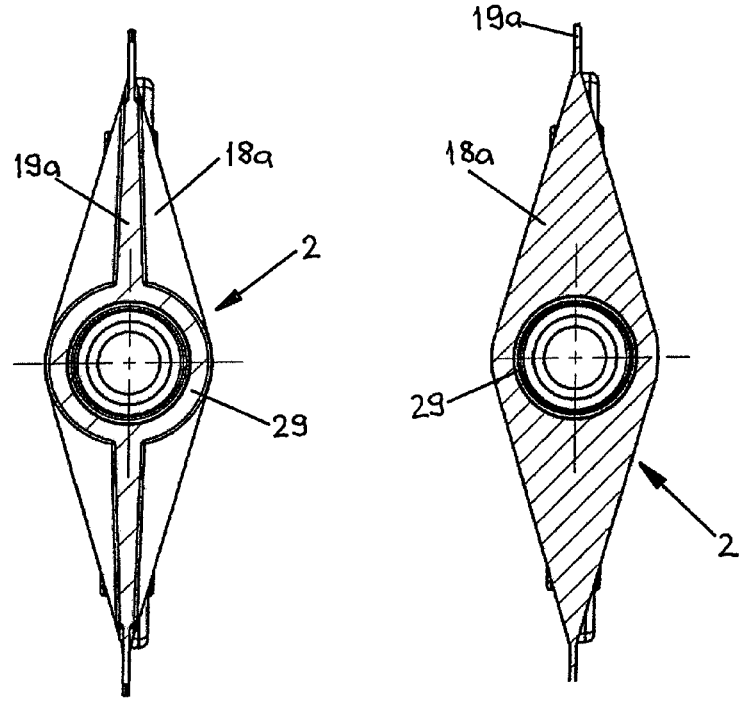

VALVE FOR LIQUID VESSELS

The invention relates to a valve for opening and closing a liquid vessel or liquid pouch and to a liquid vessel containing such a valve.

A vessel valve is known from EP 0 998 644 LAST that can be opened and closed again by the introducing of a pump connection piece into the central valve opening. The closure cap rests in the closed state of the valve in the central valve opening and is held fast on the valve body by a peripherally circumferential lip resting on a shoulder surface formed by a widening of the valve opening. When the valve is opened the circumferential lip is pressed inward on the closure cap against the longitudinal axis of the valve opening and the closure cap is pushed out of the valve opening. During the closing of the valve the closure cap, that is detachably fastened on the pump connection piece, is again drawn so far into the valve opening until the circumferential lip again snaps into the widening in the valve opening and rests on the shoulder surface. The closure cap is then fastened on the valve body and closes the valve opening so that no liquid can flow out of the vessel.

This known device has the disadvantage that during the closing of the valve the valve cap can be torn away from the pump connection piece by an improper manipulation before the part of the closure cap to be introduced into the valve opening and containing the circumferential lip is drawn into the valve opening, for example, in that the edge of the closure cap directed against the valve body is standing on the valve body.

The invention intends to help here. The invention has the basic problem of creating a vessel valve whose closure element is automatically brought into a position that seals the valve opening and is held in this closed position by a constantly acting contact pressure.

The invention solves the posed problem with a valve as well as with a liquid vessel as disclosed herein.

The advantages achieved by the invention consist substantially in that:
- the closure element can initially be pressed into a first position into the passage opening so that both sealing lips are pressed into the passage opening and a liquid vessel fastened on the valve can be closed in a liquid tight and firm manner. After the removal of the liquid vessel from the pump unit the closure element is automatically pressed by spring power into a second position in which only the first sealing lip is pressed into the passage opening while the second sealing lip rests on account of the stronger interference fit on the edge of the passage opening. The liquid vessel is thus sealed without the closure element having to be completely pressed in again into the passage opening;
- the valve can be removed from a pump connection piece without a great expenditure of force since the head of the pump connection piece can be readily removed from the closure element and the valve is closed by spring power; and
- the valve is less susceptible to being damaged when the liquid vessel is fastened to and removed from the pump unit since the closure element is pressed by the spring element into the passage opening and no positively intermeshing parts have to be brought by elastic deformation out of the engagement.

Other advantageous embodiments of the invention can be commented on as follows:

In a special embodiment the valve body comprises a spring holding part that projects over the bottom side and has a holder arranged opposite the passage opening for the spring element. The spring element is preferably constructed as a pressure spring.

In another embodiment the spring element is arranged between the holder on the spring holding part and between the closure element so that the closure element is pressed from the bottom side into the passage opening of the valve body.

In another embodiment the spring holding part is constructed to be substantially U-shaped and comprises two side arms firmly connected to the valve body and a web-shaped bridge part firmly connected to the side arms. As a result of this embodiment of the valve body the spring holding part can be constructed in one piece with the valve body.

In yet another embodiment the closure element is held by one or more elastic arms connected to the spring holding part or to the valve body. This embodiment makes it possible that the closure element cannot be lost. In addition, the valve body, the spring holding part, the closure element and the elastic arms can be manufactured in one piece.

In another embodiment the valve body, spring holding part and the closure element and preferably the elastic arms are manufactured in one piece. This can have the advantage that the valve body, spring holding part, closure element and the elastic arms can be produced as an injection-molded part, for example, from polypropylene (PP).

In yet another embodiment the holder for the spring element is constructed as a hollow space that penetrates through the bridge part coaxially to the central axis of the valve body and comprises means for axially holding the spring element. Thus, the spring element can be introduced from the outside and subsequently held in the hollow space and guided. Noses can be arranged, for example, on the terminal end of the hollow space and projecting into the hollow space and which function as axial support for the spring element and as means for holding the spring element.

In another embodiment the bridge part has a terminal outer surface and at least two continuations that are substantially parallel to the central axis are arranged on this outer surface through which continuations the hollow space extends. The advantage of this embodiment is essentially the fact that the hollow space is lengthened for a better guidance of the spring element.

In another embodiment the valve body is constructed as a hollow cylinder and preferably comprises one or more substantially rhomboid lamellae that extend transversally to the central axis of the valve body. As a consequence, it becomes possible that the valve body can be welded rigidly to a pouch.

In yet another embodiment a first reinforcement rib is arranged between the lamellae and a second reinforcement rib is preferably arranged on the outside on the spring holding part so that a rigid constructions of the valve body results.

The spring element is preferably a separate part.

In a special embodiment of the liquid vessel the pouch can be welded on the edge and the valve body welded into the weldable edge of a pouch. The edge of the pouch is welded up to an edge section so that an opening is formed in the pouch for filling the pouch.

The invention and further developments of the invention are explained in more detail in the following using the partially schematic views.

In the drawings:

FIG. 3 shows a cross section through the embodiment of the valve in accordance with the invention and shown in FIG. 1 along the line D-D in FIG. 2;

FIG. 4 shows a cross-section through the embodiment of the valve in accordance with the invention and shown in FIG. 1 along the line C-C in FIG. 2;

Figure 1:
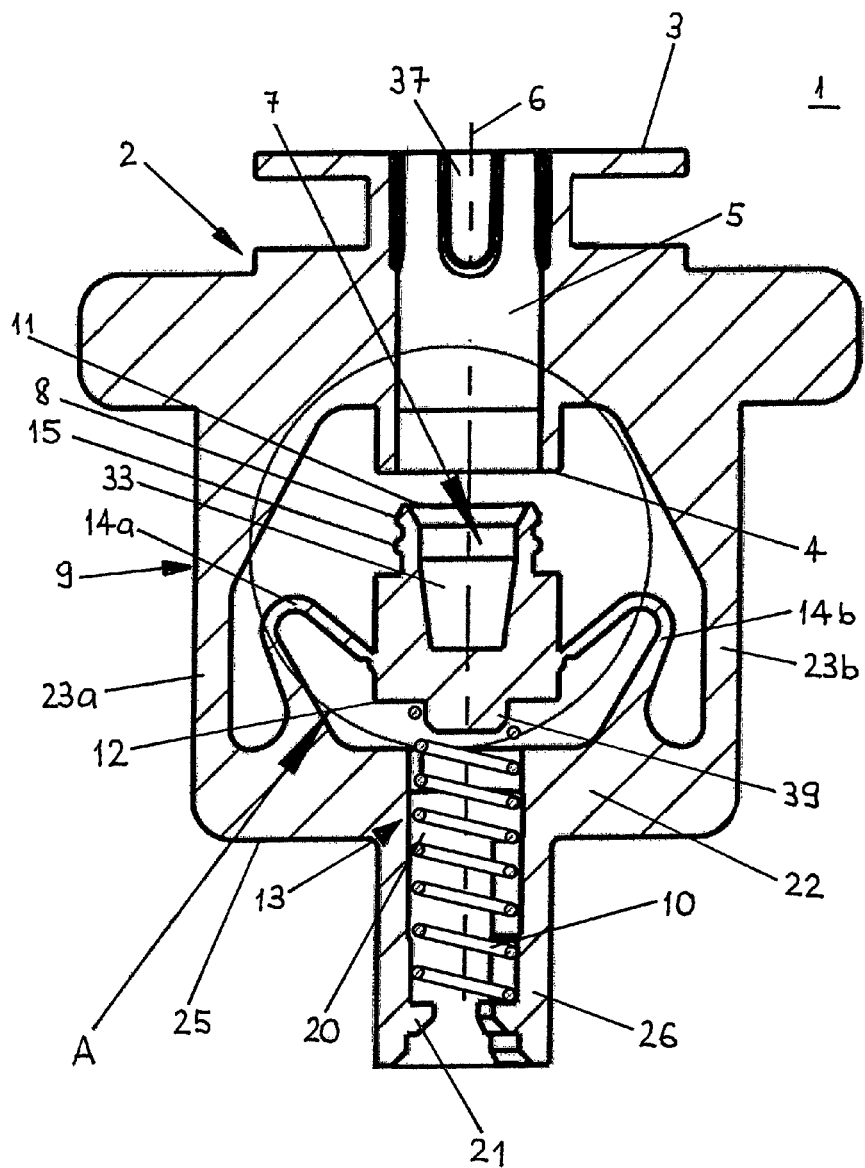
FIG. 1 shows a longitudinal section through an embodiment of the valve in accordance with the invention.

The embodiment of the valve 1 shown in FIG. 1 substantially comprises a valve body 2 with the passage opening 5, a closure element 7 that can be pressed into the passage opening 5 and comprises a spring element 10 that presses the closure element 7 into the passage opening 5.

The valve body 2 has a central axis 6, a top side 3 arranged transversely to the central axis 6, a bottom side 4 that is also arranged transversely to the central axis 6 and comprises a passage opening 5 penetrating the valve body 2 coaxially from the top side 3 to the bottom side 4. Furthermore, the valve body 2 comprises a spring holding part 9 that is constructed substantially in a U shape and extends over the bottom side 4. The spring holding part 9 has two side arms 23a, 23b whose first ends are firmly connected on the bottom side 4 to the valve body 2 and whose second ends are firmly connected to a web-shaped bridge part 22. The spring holding part 9 has a lesser width than the valve body 2 so that when valve 1 is open, liquid can flow through the free space between the side arms 23a, 23b and between the bridge part 22 and the bottom side 4 of the valve body 2 into the passage opening 5.

The bridge part 22 comprises a holder 13 for the spring element 10 and arranged opposite the passage opening 5. The holder 13 for the spring element 10 is constructed as a hollow space 20 that runs through the bridge part 22 coaxially to the central axis 6 of the valve body 2. Two continuations 26 that are substantially parallel to the central axis 6 are arranged on the terminal outer surface 25 of the bridge part 22 so that the hollow space 20 is lengthened for a better guiding of the spring element 10. A nose 21 extending into the hollow space 20 is arranged at the terminal end of each of the continuations 26 and serves as an axial support for the spring electrode 10. The top side 3 and the bottom side 4 are constructed in a planar manner in the area of the passage opening 5 of the valve body 2.

The closure element 7 has a front end 11 and a rear end 12 and can be introduced with the front end 11 in front from the bottom side 4 of the valve body 2 into the passage opening 5. The closure element 7 is constructed substantially in a circular, cylindrical shape and comprises a first axial section that is directed toward the front end 11 and can be introduced into the passage opening 5 and comprises a second axial section that has a greater cross-sectional surface, is directed toward the rear end 12 and can be brought to rest on the bottom side 4 of the valve body 2. A spring receptacle 39 is arranged on the rear end 12 of the closure element 7 and is constructed like a pin-shaped continuation. A first peripherally circumferential sealing lip 8 is arranged at the front end 11 of the closure element 7 on the first axial section of the closure element 7. A second peripherally circumferential sealing lip 15 is arranged on the first axial section at a distance from the first sealing lip 8 toward the rear end 12 of the closure element 7. The first sealing lip 8 can be pressed with a slight interference fit P1 into the passage opening 5 whereas the second sealing lip 15 can be pressed with a stronger interference fit P2 into the passage opening 5. The closure element 7 is movably fastened by two elastic arms 14a, 14b on the valve body 2. The two elastic arms 14a, 15b are constructed to be substantially C-shaped so that the closure element 7 can shift coaxially to the central axis 6 of the valve body 2 in both directions. The two elastic arms 14a, 14b are arranged opposite one another relative to the central axis 6 of the valve body 2. Each first end of the elastic arms 14a, 14b is connected to the bridge part 22 of the spring holding part 9 whereas the second ends of the elastic arms 14a, 14b are laterally connected to the closure element 7.

In an alternative embodiment of the valve 1 the first ends of the elastic arms 14a, 14b can be connected to the valve body 2 or to the side arms 23a, 23b.

The valve body 2 including the spring holding part 9, the two elastic arms 14a, 14b and the closure element 7 are constructed in one piece and can be manufactured as an injection-molded part and, for example, from polypropylene (PP).

The spring element 10 is constructed as a helical spring. A first section of the spring element 10 is introduced into the hollow space 20 in the holder 13 on the spring holding part 9 whereas a second section of the spring element 10 is pushed over the spring receptacle 39 on the rear end 12 of the closure element 7 so that the spring element 10 is axially held on both ends and is also laterally guided on the first and the second section. The closure element 7 is pressed against the bottom side 4 of the valve body 2 by the spring element 10.

Figure 2:
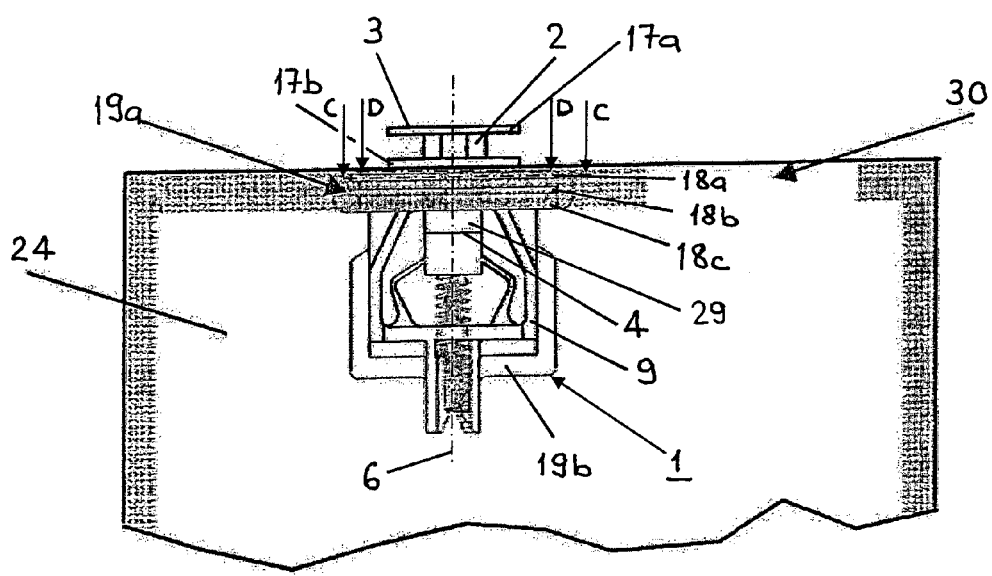
FIG. 2 shows a view of the embodiment of the valve in accordance with the invention and shown in FIG. 1 in the closed state and welded into a pouch for liquid.

As is apparent in the FIGS. 2 to 4, the valve body 2 is substantially constructed as a hollow cylinder 29 and comprises three rhomboid lamellas 18a, 18b, 18c arranged transversely to the central axis 6 and that are arranged on the hollow cylinder 29 at a distance from each other along the central axis 6. The valve body 2 furthermore comprises a first flange 17a arranged terminally on the top side 3 and comprises a second flange 17b at a distance toward the bottom side 4.

Furthermore, a reinforcement rib and 19 is arranged between the lamellae 18a, 18b, 18c and the second flange 17b which rib extends laterally over the lamellae 18a, 18b, 18c (FIG. 3). In addition, another reinforcement rib 19d can be arranged outside on the spring holding part 9 (FIG. 2).

The spring element 10 is introduced from the free ends of the continuations 26 into the hollow space 20 and pressed in until the rear end of the spring element 10 has been introduced so far into the hollow space 20 that the noses 21 on the continuations 26 snap in behind the spring element 10 and thus hold the spring element 10 in the hollow space 20. With the pressing in of the spring element 10 the closure element 7 is also pressed into the passage opening 5 and the valve 1 closed.

As is shown in FIG. 2, the closed valve body 2 is welded into the weldable edge of a pouch 24 so that the flanges 17a, 17b arranged on the top side 3 of the valve body 2 come to lie outside of the pouch 24. The pouch 24 is welded on the edge up to an edge section 30. During the filling of the pouch 24 the liquid is not filled in via the valve 1 but rather through the non-welded edge section 30. Subsequently, this edge section 30 is also welded. The valve 1 thus remains closed until the end user.

Figure 5:
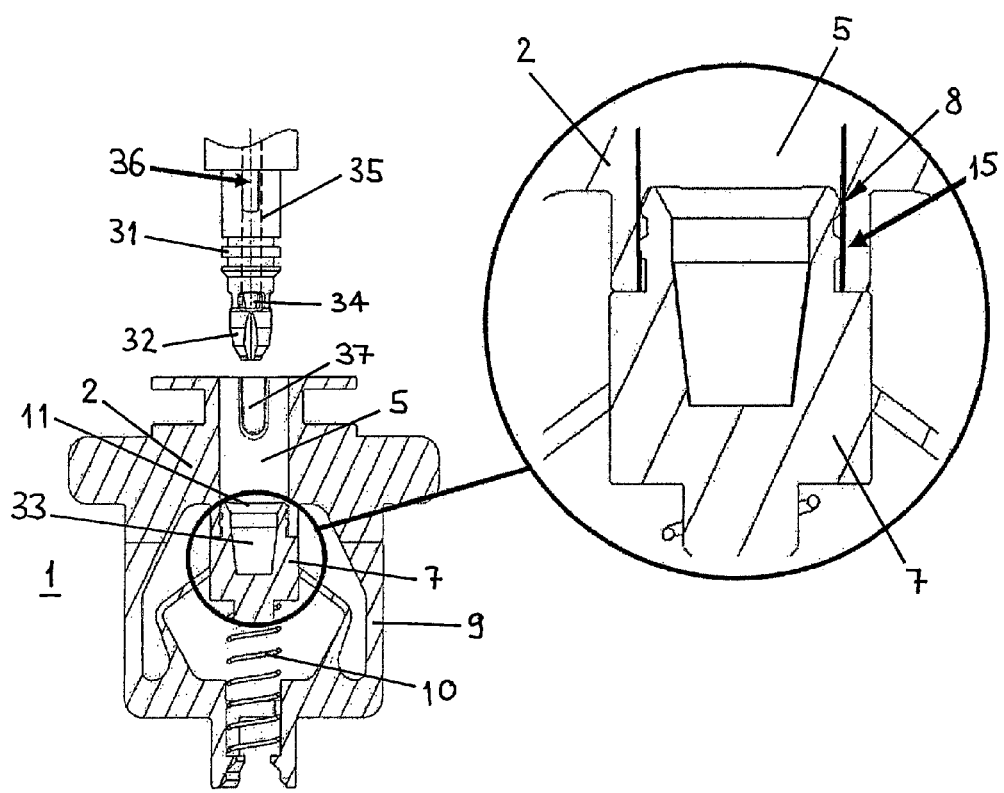
FIG. 5 shows a longitudinal section of the embodiment of the valve in accordance with the invention and shown in FIG. 1 together with a pump connection piece and an enlarged sectional view of the detail A in FIG. 1 with the valve closed.
Figure 6:
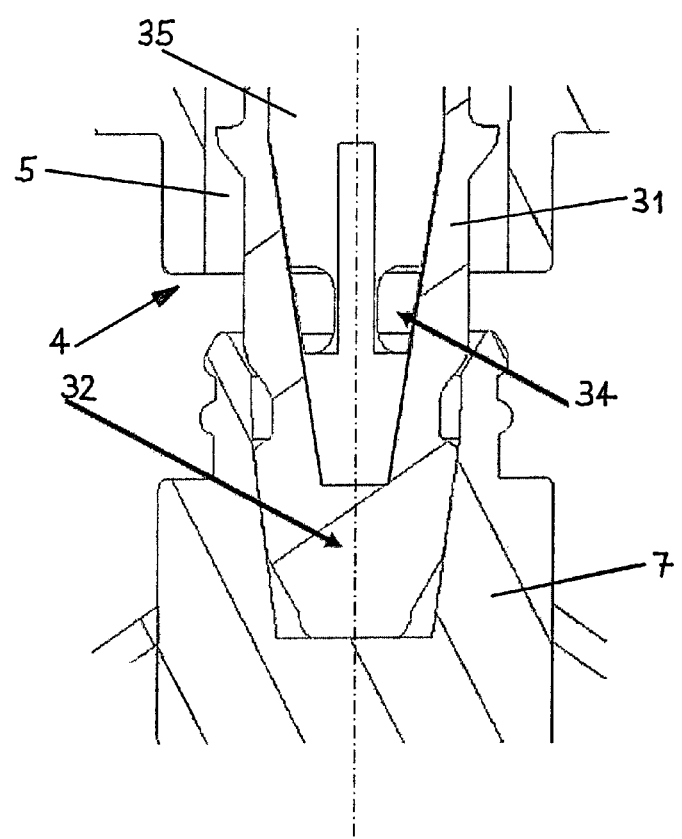
FIG. 6 shows an enlarged sectional view of the detail A in FIG. 1 with the valve completely opened.
Figure 7:
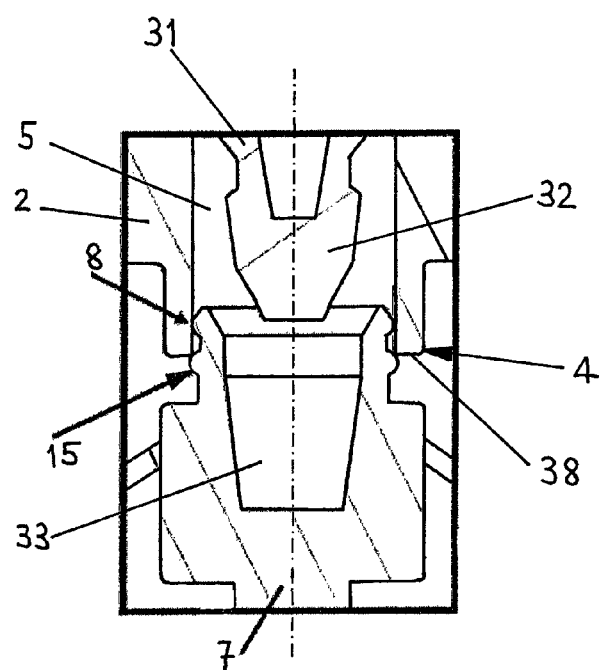
FIG. 7 shows an enlarged sectional view of the detail A in FIG. 1 with the closure element in the second position.

The operation of the valve 1 is shown in FIGS. 5 to 7 using an example. The valve 1 serves as an interface between the pouch 24 filled with liquid and the pump connection piece 31 (FIG. 5). The pouch 24 is initially firmly closed by the stronger interference fit P2 of the second sealing lip 15 on the closure electrode 7. The pouch 24 can be pushed on the pump connection piece 31 in the given position on account of the elevations 36 on the pump connection piece 31 that engage into the grooves 37 in the passage opening 5. The valve 1 is opened by placing the valve 1 onto the pump connection piece 31. Here, at first the head 32 of the pump connection piece 31 is introduced through the passage opening 5 into a blind hole 33 open at the front end 11 of the closure element 7. The valve 1 is pushed onto the pump connection piece 31 until the head 32 of the pump connection piece 31 is introduced into the blind hole 33 in the closure element 7 and rests on the bottom of the blind hole 33. Here, the closure element 7 has not yet been pressed out of the passage opening 5 so that the valve 1 still remains closed by the second sealing lip 15. The pouch and the valve 1 are subsequently pushed with a slightly elevated expenditure of force further onto the pump connection piece 31 so that the closure element 7 is partially pressed out of the passage opening 5 of the valve body 2. The second sealing lip 15 loses its function. However, the first sealing lip 8 continues to seal off the passage opening 5. By pushing the valve 1 further onto the pump connection piece 31 the closure element 7 is coaxially pressed away from the bottom side 4 of the valve body 2 against the spring force of the spring element 10 until the lateral openings 34 of the pump connection piece 31 project over the bottom side 4 in the area of the passage opening 5 of the valve body 2. The valve 1 is then completely open. The liquid can then be pumped out from the pouch 24 through the side openings 34 and a central bore 35 in the pump connection piece 31 (FIG. 6).

If the pouch 24 is separated from the pump connection piece 31 again, the valve 1 should close firmly again so that no liquid runs out of the pouch 24 via the pump unit. When the pouch 24 is removed from the pump connection piece 31 the head 32 of the pump connection piece 31 is axially guided out of the blind hole 33 in the closure element 7 and the closure element 7 is pressed by the spring element 10 into the passage opening 5 of the valve body 2. Here, only the first sealing lip 8 with the softer interference fit P1 is pressed into the passage opening 5 while the second sealing lip 15 rests on the bottom side 4 of the valve body 2 on the shoulder 28, that is formed on the mouth of the passage opening 5. The valve 1 is no longer closed firmly in this second position of the closure element 7 as in the first position of the closure element 7 when the first and the second sealing lips 8, 15 are introduced into the passage opening 5. However, the valve 1 still seals the pouch 24 liquid-tight in this second position of the closure element 7 (FIG. 7).

Although the present invention and its advantages were described in detail, it is to be understood that numerous changes, substitutions and amendments can be made without deviating from the protective scope of the invention as defined in the attached claims. Furthermore, it is not intended to limit the protective scope of the present application to the special embodiment, presented in the specification, of the valve, the processing, the manufacture, the substance connections and the method steps. As experts can gather from the disclosure of the present invention, methods, processes, manufacture, substance connections, means, methods or steps that currently exist or are to be developed later in which fulfills the same function or achieve substantially the same results as the corresponding embodiment explained above can be used in accordance with the present invention. Accordingly, the attached claims are intended to include such valves, processes, manufacture, substance connections, means, methods and steps in their protective scope.

The invention claimed is:

1. A valve for opening and closing a liquid vessel or pouch comprising:
   a valve body with a central axis, a top side arranged transversely to the central axis, a bottom side also arranged transversely to the central axis and a passage opening running coaxially through the valve body from the top side to the bottom side; and
   a closure element with a front end directed toward the passage opening and with an axially opposed rear end, wherein the closure element is configured to be pressed into the passage opening coaxially to the central axis from the bottom side such that the passage opening is closed liquid-tight by the closure element;
wherein:
   the closure element is urged by a spring element into the passage opening;
   the closure element comprises on the front end a first sealing lip that is configured to be pressed with an interference fit (P1) into the passage opening;
   the closure element comprises, axially behind the first sealing lip, a second sealing lip that is configured to be pressed with an interference fit (P2) into the passage opening; and
   the second sealing lip is circumferentially larger than the first sealing lip such that interference fit (P2) is tighter than interference fit (P1).

2. The valve according to claim 1, wherein the valve body comprises a spring holding part that projects over the bottom side and comprises a holder for the spring element, wherein said holder is arranged opposite the passage opening.

3. The valve according to claim 1, wherein the spring element is constructed as a pressure spring.

4. The valve according to claim 2, wherein the spring element is arranged between the holder on the spring holding part and between the closure element so that the closure element is pressed from the bottom side into the passage opening of the valve body.

5. The valve according to claim 2, wherein the spring holding part is constructed to be substantially U-shaped and comprises two side arms firmly connected to the valve body and comprises a web-shaped bridge part firmly connected to the side arms.

6. The valve according to claim 1, wherein the closure element is held by one or more elastic arms connected to the spring holding part or to the valve body.

7. The valve according to claim 2, wherein the valve body, the spring holding part and the closure element are manufactured in one piece.

8. The valve according to claim 5, wherein the holder for the spring element is constructed as a hollow space that penetrates through the bridge part coaxially to the central axis of the valve body and comprises means for axially holding the spring element.

9. The valve according to claim 8, wherein the bridge part has a terminal outer surface, wherein at least two continuations that are substantially parallel to the central axis are arranged on the terminal outer surface of the bridge part, and wherein the hollow space extends through said at least two continuations.

10. The valve according to claim 1, wherein the valve body is constructed as a hollow cylinder.

11. The valve according to claim 1, wherein the spring element is a separate part.

12. A liquid vessel comprising a pouch with a valve according to claim 1.

13. The liquid vessel according to claim 12, wherein the pouch can be welded on the edge and the valve body is welded into the weldable edge of a pouch, and wherein the edge of the pouch is welded up to an edge section so that an opening is formed in the pouch for filling the pouch.

14. The valve according to claim 7, wherein the elastic arms are manufactured in one piece with the valve body, the spring holding part and the closure element.

15. The valve according to claim 10, wherein the valve body further comprises one or more substantially rhomboid lamellae that extend transversally to the central axis of the valve body.

16. The valve according to claim 15, wherein a first reinforcement rib is arranged between the lamellae.

17. The valve according to claim 16, wherein a second reinforcement rib is arranged on the outside on the spring holding part.

* * * * *